(12) United States Patent
Wong

(10) Patent No.: US 6,870,111 B2
(45) Date of Patent: Mar. 22, 2005

(54) BENDING MODE LIQUID METAL SWITCH

(75) Inventor: Marvin Glenn Wong, Woodland Park, CO (US)

(73) Assignee: Agilent Technologies, Inc., Palo Alto, CA (US)

( * ) Notice: Subject to any disclaimer, the term of this patent is extended or adjusted under 35 U.S.C. 154(b) by 0 days.

(21) Appl. No.: 10/413,328

(22) Filed: Apr. 14, 2003

(65) Prior Publication Data

US 2004/0200703 A1 Oct. 14, 2004

(51) Int. Cl.$^7$ .............................................. H01H 29/00
(52) U.S. Cl. .................................... 200/182; 200/193
(58) Field of Search ............................... 200/182, 190, 200/193, 199, 243, 241, 282–286; 310/328

(56) References Cited

U.S. PATENT DOCUMENTS

| | | |
|---|---|---|
| 2,312,672 A | 3/1943 | Pollard, Jr. |
| 2,564,081 A | 8/1951 | Schilling |
| 3,430,020 A | 2/1969 | Tomkewitsch et al. |
| 3,529,268 A | 9/1970 | Rauterberg |
| 3,600,537 A | 8/1971 | Twyford |
| 3,639,165 A | 2/1972 | Rairden, III |
| 3,657,647 A | 4/1972 | Beusman et al. |
| 4,103,135 A | 7/1978 | Gomez et al. |
| 4,200,779 A | 4/1980 | Zakurdaev et al. |

(List continued on next page.)

FOREIGN PATENT DOCUMENTS

| | | |
|---|---|---|
| EP | 0593836 A1 | 4/1994 |
| FR | 2418539 | 9/1979 |
| FR | 2458138 | 12/1980 |
| FR | 2667396 | 4/1992 |
| JP | SHO 36-18575 | 10/1961 |
| JP | SHO 47-21645 | 10/1972 |
| JP | 62-276838 | 12/1987 |
| JP | 63-294317 | 12/1988 |
| JP | 8-125487 | 5/1996 |
| JP | 9161640 A | 6/1997 |
| WO | WO99/46624 | 12/1999 |

OTHER PUBLICATIONS

Jonathan Simon, "A Liquid–Filled Microrelay With A Moving Mercury Microdrop" (Sept, 1997) Journal of Microelectromechinical Systems, vol. 6, No. 3, PP 208–216.

Marvin Glenn Wong, "A Piezoelectrically Actuated Liquid Metal Switch", May 2, 2002, patent application (pending), 12 pages of specification, 5 pages of claims, 1 page of abstract, and 10 sheets of drawings (Fig. 1–10).

TDB–ACC–NO:NB8406827, "Integral Power Resistors For Aluminum Substrate", IBM Technical Disclosure Bulletin, Jun. 1984, US, vol. 27, Issue No. 1B, p. 827.

Bhedwar, Homi C., et al. "Ceramic Multilayer Package Fabrication," Electronic Materials Handbook, Nov. 1989, pp 460–469, vol. 1 Packaging, Section 4; Packages.

Kim, Joonwon, et al., "A Micromechanical Switch With Electrostatically Driven Liquid–Metal Droplet." Sensors and Actuators, A: Physical. v 9798, Apr. 1, 2002, 4 pages.

*Primary Examiner*—Elvin Enad
*Assistant Examiner*—Lisa Klaus

(57) ABSTRACT

A piezoelectric relay is disclosed in which a liquid metal droplet is moved within a switching channel formed in a relay housing. A signal path passing through the switching channel is blocked or unblocked by motion of the liquid metal droplet that coalesces with one of two additional liquid metal droplets. Motion of the liquid metal droplets is controlled by one or more piezoelectric pumps that control the flow of actuation fluid between a fluid reservoir and the switching channel. The liquid metal droplets are held in place by surface tension acting on wettable contact pads within the switching channel. The surface tension of the liquid provides a latching mechanism for the relay.

13 Claims, 5 Drawing Sheets

U.S. PATENT DOCUMENTS

| | | | |
|---|---|---|---|
| 4,238,748 A | | 12/1980 | Goullin et al. |
| 4,245,886 A | | 1/1981 | Kolodzey et al. |
| 4,336,570 A | | 6/1982 | Brower |
| 4,419,650 A | | 12/1983 | John |
| 4,434,337 A | | 2/1984 | Becker |
| 4,475,033 A | | 10/1984 | Willemsen et al. |
| 4,505,539 A | | 3/1985 | Auracher et al. |
| 4,582,391 A | | 4/1986 | Legrand |
| 4,628,161 A | | 12/1986 | Thackrey |
| 4,652,710 A | | 3/1987 | Karnowsky et al. |
| 4,657,339 A | | 4/1987 | Fick |
| 4,742,263 A | * | 5/1988 | Harnden et al. ............ 310/331 |
| 4,786,130 A | | 11/1988 | Georgiou et al. |
| 4,797,519 A | | 1/1989 | Elenbaas |
| 4,804,932 A | | 2/1989 | Akanuma et al. |
| 4,988,157 A | | 1/1991 | Jackel et al. |
| 5,278,012 A | | 1/1994 | Yamanaka et al. |
| 5,415,026 A | | 5/1995 | Ford |
| 5,502,781 A | | 3/1996 | Li et al. |
| 5,644,676 A | | 7/1997 | Blomberg et al. |
| 5,675,310 A | | 10/1997 | Wojnarowski et al. |
| 5,677,823 A | | 10/1997 | Smith |
| 5,751,074 A | | 5/1998 | Prior et al. |
| 5,751,552 A | | 5/1998 | Scanlan et al. |
| 5,828,799 A | | 10/1998 | Donald |
| 5,841,686 A | | 11/1998 | Chu et al. |
| 5,849,623 A | | 12/1998 | Wojnarowski et al. |
| 5,874,770 A | | 2/1999 | Saia et al. |
| 5,875,531 A | | 3/1999 | Nellissen et al. |
| 5,886,407 A | | 3/1999 | Polese et al. |
| 5,889,325 A | | 3/1999 | Uchida et al. |
| 5,912,606 A | | 6/1999 | Nathanson et al. |
| 5,915,050 A | | 6/1999 | Russell et al. |
| 5,972,737 A | | 10/1999 | Polese et al. |
| 5,994,750 A | | 11/1999 | Yagi |
| 6,021,048 A | | 2/2000 | Smith |
| 6,180,873 B1 | | 1/2001 | Bitko |
| 6,201,682 B1 | | 3/2001 | Mooij et al. |
| 6,207,234 B1 | | 3/2001 | Jiang |
| 6,212,308 B1 | | 4/2001 | Donald |
| 6,225,133 B1 | | 5/2001 | Yamamichi et al. |
| 6,278,541 B1 | | 8/2001 | Baker |
| 6,304,450 B1 | | 10/2001 | Dibene, II et al. |
| 6,320,994 B1 | | 11/2001 | Donald et al. |
| 6,323,447 B1 | | 11/2001 | Kondoh |
| 6,351,579 B1 | | 2/2002 | Early et al. |
| 6,356,679 B1 | | 3/2002 | Kapany |
| 6,373,356 B1 | | 4/2002 | Gutierrez |
| 6,396,012 B1 | | 5/2002 | Bloomfield |
| 6,396,371 B2 | | 5/2002 | Streeter et al. |
| 6,408,112 B1 | | 6/2002 | Bartels |
| 6,446,317 B1 | | 9/2002 | Figueroa et al. |
| 6,453,086 B1 | | 9/2002 | Tarazona |
| 6,470,106 B2 | | 10/2002 | McClelland et al. |
| 6,487,333 B2 | | 11/2002 | Fouquet et al. |
| 6,501,354 B1 | | 12/2002 | Gutierrez et al. |
| 6,512,322 B1 | | 1/2003 | Fong et al. |
| 6,515,404 B1 | | 2/2003 | Wong |
| 6,516,504 B2 | | 2/2003 | Schaper |
| 6,559,420 B1 | | 5/2003 | Zarev |
| 6,633,213 B1 | | 10/2003 | Dove |
| 2002/0037128 A1 | | 3/2002 | Burger et al. |
| 2002/0146197 A1 | | 10/2002 | Yong |
| 2002/0150323 A1 | | 10/2002 | Nishida et al. |
| 2002/0168133 A1 | | 11/2002 | Saito |
| 2003/0035611 A1 | | 2/2003 | Shi |

\* cited by examiner

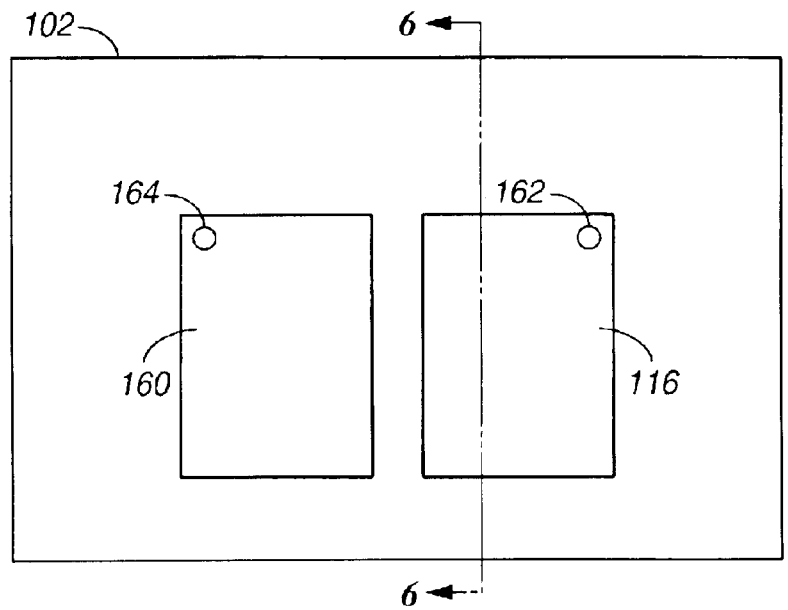
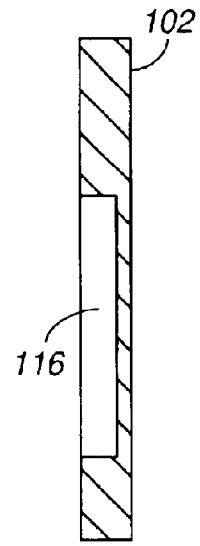
FIG. 5　　　　FIG. 6
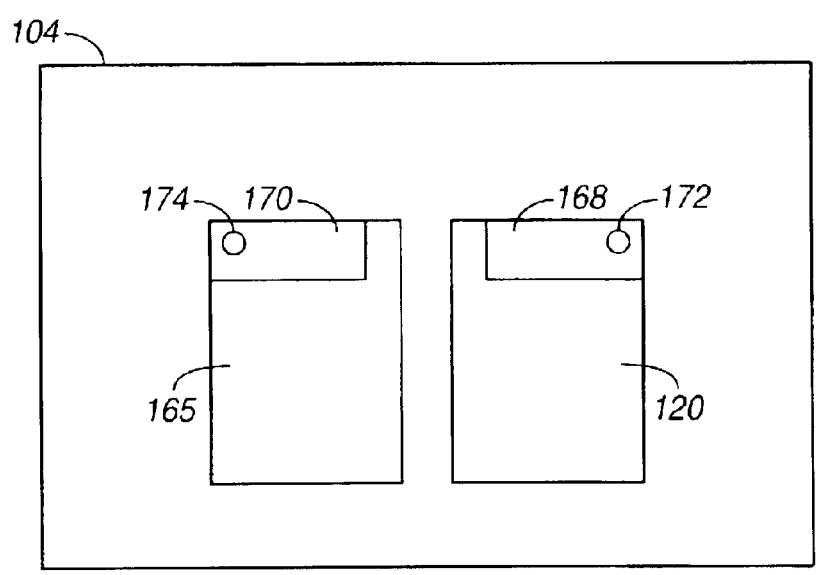
FIG. 7

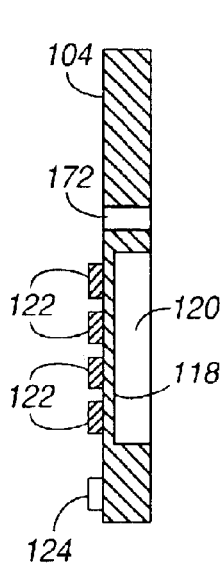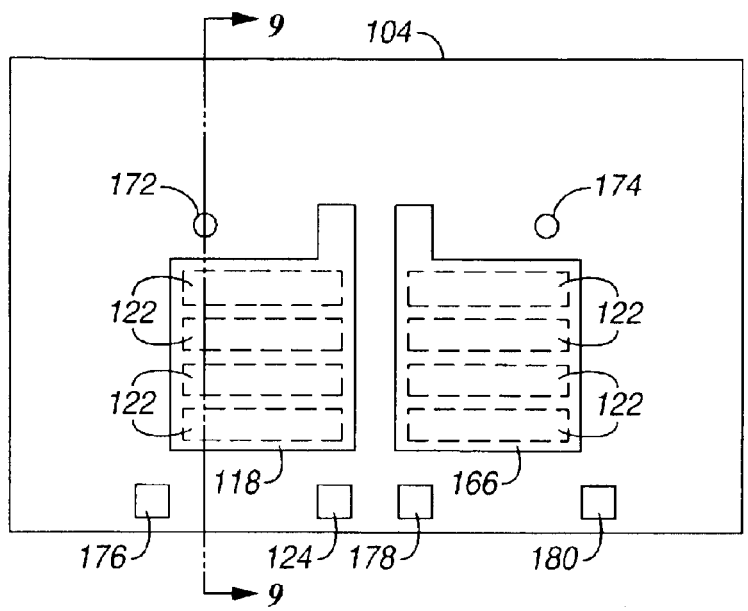
FIG. 9  FIG. 8
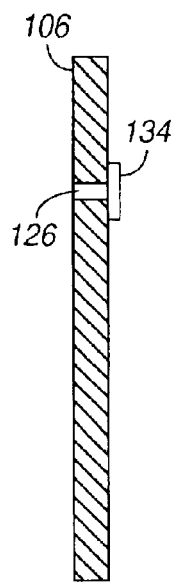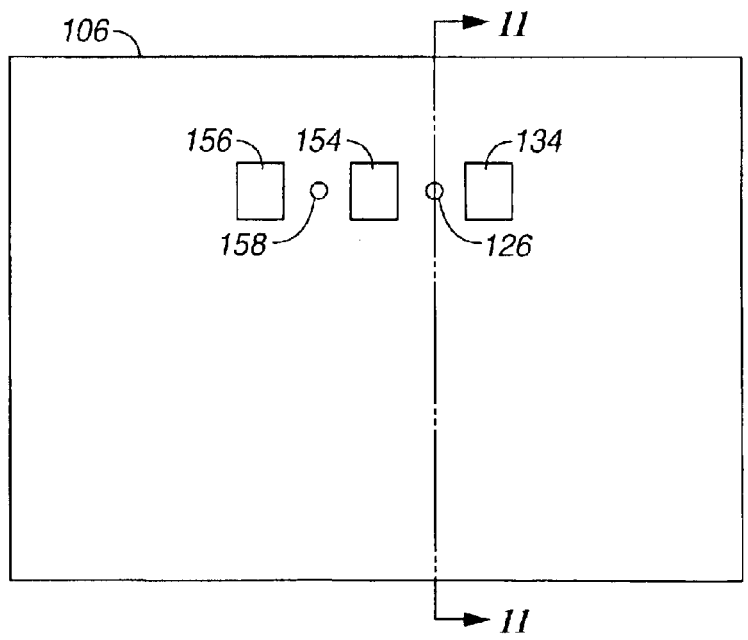
FIG. 11  FIG. 10

BENDING MODE LIQUID METAL SWITCH

CROSS REFERENCE TO RELATED APPLICATIONS

This application is related to the following co-pending U.S. patent applications, being identified by the below enumerated identifiers and arranged in alphanumerical order, which have the same ownership as the present application and to that extent are related to the present application and which are hereby incorporated by reference:

Application 10010448-1, titled "Piezoelectrically Actuated Liquid Metal Switch", filed May 2, 2002 and identified by Ser. No. 10/137,691;

Application 10010529-1, "Bending Mode Latching Relay", and having the same filing date as the present application;

Application 10010531-1, "High Frequency Bending Mode Latching Relay", and having the same filing date as the present application;

Application 10010570-1, titled "Piezoelectrically Actuated Liquid Metal Switch", filed May 2, 2002 and identified by Ser. No. 10/142,076;

Application 10010571-1, "High-frequency, Liquid Metal, Latching Relay with Face Contact", and having the same filing date as the present application;

Application 10010572-1, "Liquid Metal, Latching Relay with Face Contact", and having the same filing date as the present application;

Application 10010573-1, "Insertion Type Liquid Metal Latching Relay", and having the same filing date as the present application;

Application 10010617-1, "High-frequency, Liquid Metal, Latching Relay Array", and having the same filing date as the present application;

Application 10010618-1, "Insertion Type Liquid Metal Latching Relay Array", and having the same filing date as the present application;

Application 10010634-1, "Liquid Metal Optical Relay", and having the same filing date as the present application;

Application 10010640-1, titled "A Longitudinal Piezoelectric Optical Latching Relay", filed Oct. 31, 2001 and identified by Ser. No. 09/999,590;

Application 10010643-1, "Shear Mode Liquid Metal Switch", and having the same filing date as the present application;

Application 10010656-1, titled "A Longitudinal Mode Optical Latching Relay", and having the same filing date as the present application;

Application 10010663-1, "Method and Structure for a Pusher-Mode Piezoelectrically Actuated Liquid Metal Switch", and having the same filing date as the present application;

Application 10010664-1, "Method and Structure for a Pusher-Mode Piezoelectrically Actuated Liquid Metal Optical Switch", and having the same filing date as the present application;

Application 10010790-1, titled "Switch and Production Thereof", filed Dec. 12, 2002 and identified by Ser. No. 10/317,597;

Application 10011055-1, "High Frequency Latching Relay with Bending Switch Bar", and having the same filing date as the present application;

Application 10011056-1, "Latching Relay with Switch Bar", and having the same filing date as the present application;

Application 10011064-1, "High Frequency Push-mode Latching Relay", and having the same filing date as the present application;

Application 10011065-1, "Push-mode Latching Relay", and having the same filing date as the present application;

Application 10011121-1, "Closed Loop Piezoelectric Pump", and having the same filing date as the present application;

Application 10011329-1, titled "Solid Slug Longitudinal Piezoelectric Latching Relay", filed May 2, 2002 and identified by Ser. No. 10/137,692;

Application 10011344-1, "Method and Structure for a Slug Pusher-Mode Piezoelectrically Actuated Liquid Metal Switch", and having the same filing date as the present application;

Application 10011345-1, "Method and Structure for a Slug Assisted Longitudinal Piezoelectrically Actuated Liquid Metal Optical Switch", and having the same filing date as the present application;

Application 10011397-1, "Method and Structure for a Slug Assisted Pusher-Mode Piezoelectrically Actuated Liquid Metal Optical Switch", and having the same filing date as the present application;

Application 10011398-1, "Polymeric Liquid Metal Switch", and having the same filing date as the present application;

Application 10011410-1, "Polymeric Liquid Metal Optical Switch", and having the same filing date as the present application;

Application 10011436-1, "Longitudinal Electromagnetic Latching Optical Relay", and having the same filing date as the present application;

Application 10011437-1, "Longitudinal Electromagnetic Latching Relay", and having the same filing date as the present application;

Application 10011458-1, "Damped Longitudinal Mode Optical Latching Relay", and having the same filing date as the present application;

Application 10011459-1, "Damped Longitudinal Mode Latching Relay", and having the same filing date as the present application;

Application 10020013-1, titled "Switch and Method for Producing the Same", filed Dec. 12, 2002 and identified by Ser. No. 10/317,963;

Application 10020027-1, titled "Piezoelectric Optical Relay", filed Mar. 28, 2002 and identified by Ser. No. 10/109,309;

Application 10020071-1, titled "Electrically Isolated Liquid Metal Micro-Switches for Integrally Shielded Microcircuits", filed Oct. 8, 2002 and identified by Ser. No. 10/266,872;

Application 10020073-1, titled "Piezoelectric Optical Demultiplexing Switch", filed Apr. 10, 2002 and identified by Ser. No. 10/119,503;

Application 10020162-1, titled "Volume Adjustment Apparatus and Method for Use", filed Dec. 12, 2002 and identified by Ser. No. 10/317,293;

Application 10020241-1, "Method and Apparatus for Maintaining a Liquid Metal Switch in a Ready-to-Switch Condition", and having the same filing date as the present application;

Application 10020242-1, titled "A Longitudinal Mode Solid Slug Optical Latching Relay", and having the same filing date as the present application;

Application 10020473-1, titled "Reflecting Wedge Optical Wavelength Multiplexer/Demultiplexer", and having the same filing date as the present application;

Application 10020540-1, "Method and Structure for a Solid Slug Caterpillar Piezoelectric Relay", and having the same filing date as the present application;

Application 10020541-1, titled "Method and Structure for a Solid Slug Caterpillar Piezoelectric Optical Relay", and having the same filing date as the present application;

Application 10030438-1, "Inserting-finger Liquid Metal Relay", and having the same filing date as the present application;

Application 10030440-1, "Wetting Finger Liquid Metal Latching Relay", and having the same filing date as the present application;

Application 10030521-1, "Pressure Actuated Optical Latching Relay", and having the same filing date as the present application;

Application 10030522-1, "Pressure Actuated Solid Slug Optical Latching Relay", and having the same filing date as the present application; and Application 10030546-1, "Method and Structure for a Slug Caterpillar Piezoelectric Reflective Optical Relay", and having the same filing date as the present application.

FIELD OF THE INVENTION

The invention relates to the field of switching relays, and in particular to a piezoelectrically actuated relay that latches by means of liquid surface tension.

BACKGROUND OF THE INVENTION

Communications systems using optical signals require the use of optical switches and routers. An early approach to optical switching was to convert the optical signal to an electrical signal, use an electrical switch or router and then convert back to an optical signal. More recently, optical relays have been used in which an electrical control signal is used to control the switching or routing of an optical signal. Optical relays typically switch optical signals by using movable solid mirrors or by using the creation of vapor bubbles to alter the index of refraction inside a cavity. The moveable mirrors may use electrostatic latching mechanisms, whereas bubble switches do not latch. Piezoelectric latching relays either use residual charges in the piezoelectric material to latch, or actuate switch contacts containing a latching mechanism.

Liquid metal is also used in electrical relays. A liquid metal droplet can be moved by a variety of techniques, including electrostatic forces, variable geometry due to thermal expansion/contraction, and pressure gradients. When the dimension of interest shrinks, the surface tension of the liquid metal becomes the dominant force over other forces, such as body forces (inertia). Consequently, some micro-electromechanical (MEM) systems utilize liquid metal switching.

SUMMARY

The present invention relates to a switch in which a liquid metal droplet is moved within a channel and used to block or unblock a signal path passing through the channel. The liquid metal droplet is moved by piezoelectric elements acting on a diaphragm to create a pressure changes in the channel. The liquid metal droplet adheres to wettable metal contact pads within the channel to provide a latching mechanism.

BRIEF DESCRIPTION OF THE DRAWINGS

The features of the invention believed to be novel are set forth with particularity in the appended claims. The invention itself however, both as to organization and method of operation, together with objects and advantages thereof, may be best understood by reference to the following detailed description of the invention, which describes certain exemplary embodiments of the invention, taken in conjunction with the accompanying drawings in which:

FIG. 5 is top view of a bottom cap layer of an optical relay consistent with certain embodiments of the present invention.

FIG. 6 is sectional view through a bottom cap layer of an optical relay consistent with certain embodiments of the present invention.

FIG. 7 is top view of a pump chamber layer of an optical relay consistent with certain embodiments of the present invention.

FIG. 8 is bottom view of a pump chamber layer of an optical relay consistent with certain embodiments of the present invention.

FIG. 9 is sectional view through a pump chamber layer of an optical relay consistent with certain embodiments of the present invention.

FIG. 10 is top view of a via layer of an optical relay consistent with certain embodiments of the present invention.

FIG. 11 is sectional view through a via layer of an optical relay consistent with certain embodiments of the present invention.

DETAILED DESCRIPTION

Figure 1:
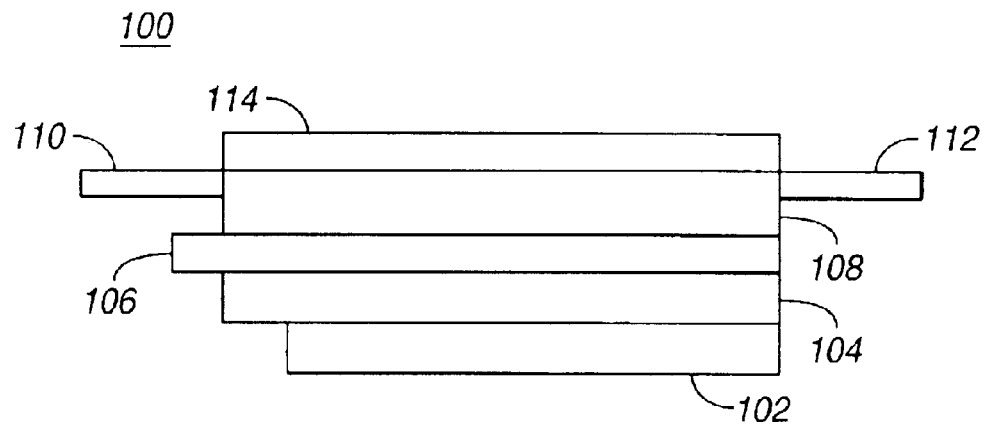
FIG. 1 is an end view of an optical relay consistent with certain embodiments of the present invention.

While this invention is susceptible of embodiment in many different forms, there is shown in the drawings and will herein be described in detail one or more specific embodiments, with the understanding that the present disclosure is to be considered as exemplary of the principles of the invention and not intended to limit the invention to the specific embodiments shown and described. In the description below, like reference numerals are used to describe the same, similar or corresponding parts in the several views of the drawings.

The present invention relates to a piezoelectrically actuated relay that switches and latches by means of a liquid metal droplet moving within a switching channel. In an exemplary embodiment, the relay uses piezoelectric elements, operating in a bending mode, to deform a diaphragm and displace an actuation fluid that in turn displaces the liquid metal. Magnetorestrictive elements, such as Terfenol-D, that deform in the presence of a magnetic field may be used as an alternative to piezoelectric elements. In the sequel, piezoelectric elements and magnetorestrictive elements will be collectively referred to as "piezoelectric elements".

The liquid metal blocks or unblocks an optical path, allowing the switching of optical signals. The liquid metal, which may be mercury, wets at least one fixed contact pad on the relay housing and is held in place by surface tension. It is noted that a switching of one or more electrical signals is also possible, wherein the switching of the one or more electrical signals may be accomplished by coupling the one or more electrical signals to one or more contact pads. The liquid metal coupling to two of the one or more contact pads may be used to effectively select an electrical signal of the one or more electrical signals. The switching of the one or more electrical signals and the switching of the optical signals may be facilitated by the use of a slug coupled to the liquid metal. In an exemplary embodiment of switching the one or more electrical signals, the slug and the liquid metal is coupled to two of the one or more contact pads so that an electrical signal path is completed that is operable to switch an electrical signal of the one or more electrical signals. In an exemplary embodiment of switching the one or more optical signals, the slug and the liquid metal are operable to block or unblock one or more of the optical signals.

In one embodiment, micro-machining techniques are used to manufacture the relay. An end view of an optical relay 100 is shown in FIG. 1. In this embodiment, the body of the relay is made up of six layers and is amenable to manufacture by micro-machining. The lowest layer is a bottom cap layer 102 containing a reservoir of actuation fluid. The next layer is a pump chamber layer 104 that incorporates the diaphragms and pump chambers of the piezoelectric pumps. The next layer is a via layer 106 containing ducts (vias) that couple the pump chambers to the switching channel. Switching of the optical signal occurs in a switching channel contained in the switching layer 108. In a first mode of operation, an optical signal enters the relay through an optical fiber or waveguide 110 and, if not blocked in the relay, exits through optical fiber or waveguide 112. The final layer is a top cap layer 114.

Figure 2:
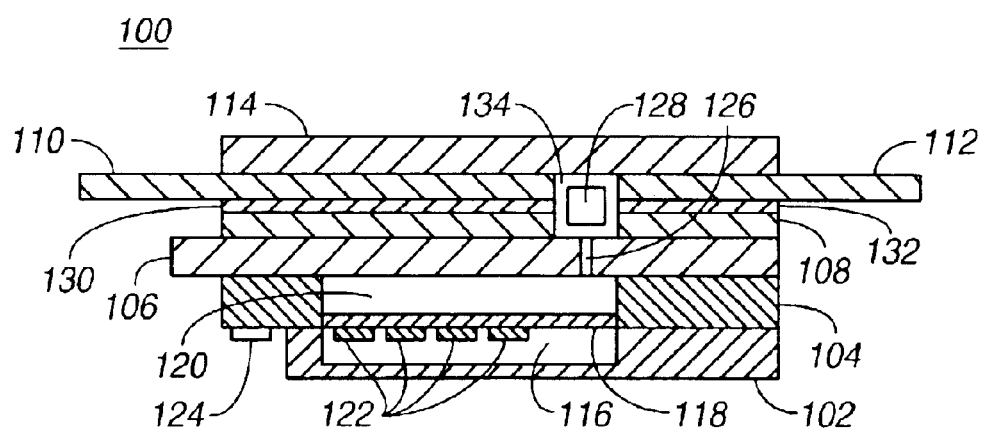
FIG. 2 is a sectional view of optical relay consistent with certain embodiments of the present invention.

FIG. 2 is a cross-sectional of the relay in FIG. 1. The section is denoted as 2—2 in FIG. 3. The lowest layer is a bottom cap layer 102 containing a reservoir 116 of actuation fluid. There may be one reservoir for each pump. The next layer is the pump chamber layer 104 that incorporates the flexible diaphragm 118 and pump chamber 120 of the piezoelectric pump. In operation, the diaphragm 118 is deformed by at least one piezoelectric element 122 attached to the diaphragm and operating in a bending mode. The piezoelectric elements may be attached to either or both sides of the diaphragm. Electrical contact pads 124 allow control signals to be coupled to the piezoelectric elements. The next layer is the via layer 106 containing ducts 126 that couple the pump chamber 120 to the switching channel 128 (contained in the switching layer 108). In the first mode of operation, an optical signal enters the relay through an optical fiber or waveguide 110 and, if not blocked in the relay, exits through optical fiber or waveguide 112. The optical waveguide 110 is embedded in a notch 130 in the switching layer 108. The optical waveguide 112 is embedded in a notch 132 in the switching layer 108. Wettable contact pads 134 are fixed to the inside of the switching channel 128. The contact pads may be made of seal belt metal. Each pad made be made in four pieces: a lower pad attached to the top of the via layer, two side pads attached to the sides of the switching channel in the switching layer, and a top pad attached to the lower surface of the top cap layer. The liquid metal used for switching is held in contact with these pads by surface tension. In certain embodiments of the present invention, the optical path may be broken by the presence of the slug coupled to the liquid metal. In a second mode of operation, an electrical signal is coupled to two of the contact pads, wherein the two contact pads are coupled by the liquid metal. In a third mode of operation, the slug is coupled to the two contact pads and further coupled to the liquid metal. In the second and third mode of operation, the optical waveguides need not be present, as switching may be accomplished using liquid metal coupling to the contact pads. In a fourth mode of operation, the slug is operable to block or unblock the optical signal. The final layer is a top cap layer 114, which provides a cap for the switching channel.

Figure 3:
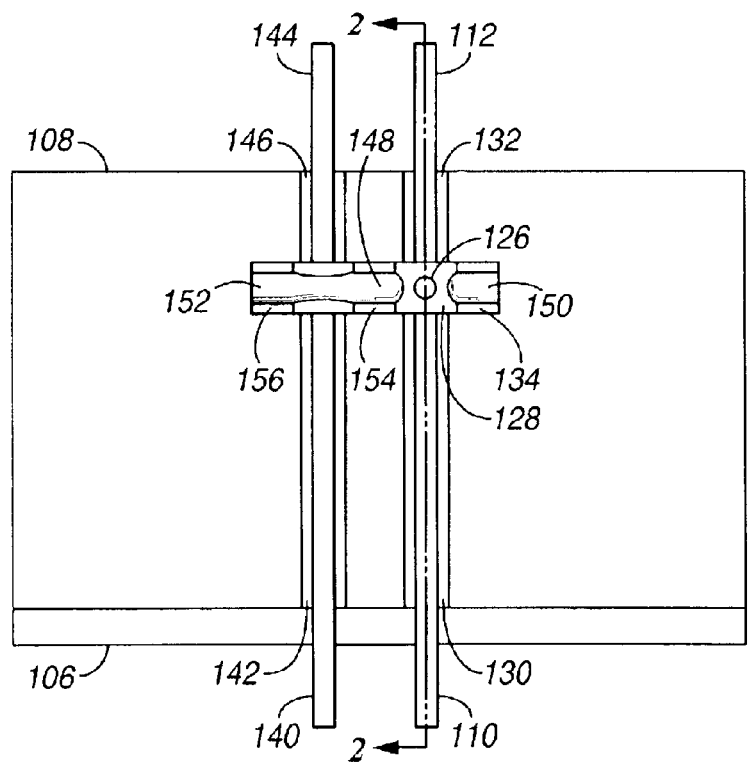
FIG. 3 is a top view of an optical relay with the top cap layer removed consistent with certain embodiments of the present invention.

A view of the optical relay with the top cap layer removed is shown in FIG. 3. The switching layer 108 is positioned above the via layer 106. An optical waveguide 110, embedded in a notch 130 in the switching layer 108, is optically aligned with the optical waveguide 112 (embedded in a notch 132). For light to couple between the waveguides 110 and 112 it must pass through the transparent actuation fluid in the switching channel 128. Optical waveguide 140, embedded in a notch 142 in the switching layer 108, is optically aligned with the optical waveguide 144 (embedded in a notch 146). A central droplet of liquid metal 148 is positioned within the switching channel 128 and is held in wetted contact with the contact pad 154. In an exemplary embodiment, the liquid metal is mercury. The central liquid metal droplet 148 may be moved to coalesce with one of the further liquid metal droplets 150 and 152. The liquid metal droplets 150 and 152 are in wetted contact with contact pads 134 and 156, respectively. The total volume of liquid metal is chosen so that only two volumes coalesce at one time. The contact pads may be made of seal belt metal, for example. Each belt is made up of four elements, two attached to the switching layer 108, one attached to the top of via layer 106 and one attached to the underside of the top cap layer 114. Surface tension in the liquid metal droplets resists motion of the liquid. When the liquid metal droplets 148 and 152 are coalesced, as shown in FIG. 3, there is no gap between the droplets through which light can pass, so the optical path between the waveguides 140 and 144 is blocked. However, light may pass through the gap between liquid metal droplets 148 and 150, so the optical path between waveguides 110 and 112 is open. The section 2—2 is shown in FIG. 2, and is described above. It is noted that in certain embodiments of the present invention, the slug may be coupled to the liquid metal droplets so that the liquid metal droplets and the slug may be used to block or unblock light transmission between the optical waveguides. It is further noted that the contact pads may be used to switch electrical signals, wherein the electrical signals are switched based upon a position of the liquid metal droplets.

Figure 4:
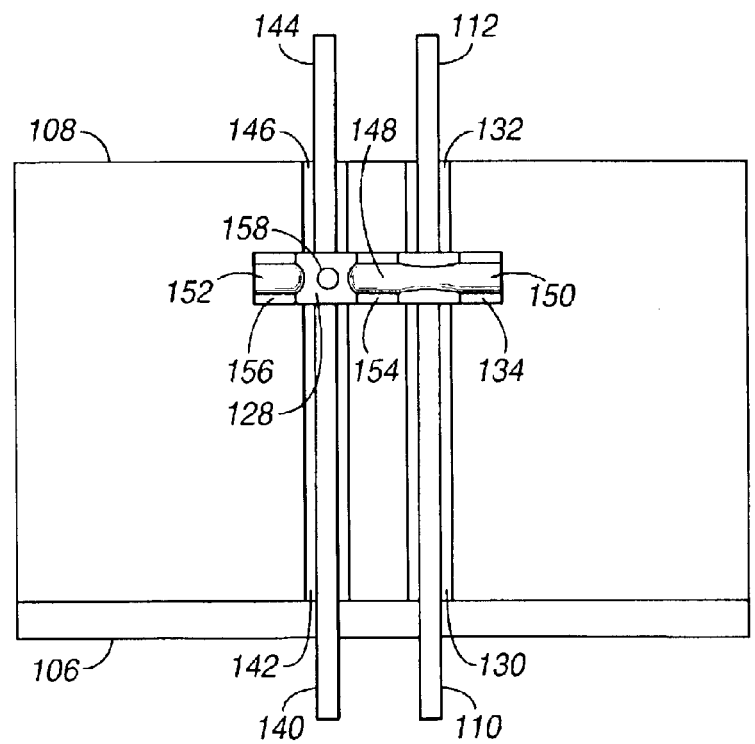
FIG. 4 is a further top view of an optical relay with the top cap layer removed consistent with certain embodiments of the present invention.

Motion of the liquid droplets is controlled by a transparent, inert, electrically non-conducting actuation fluid that fills the interior of the relay surrounding the liquid metal droplets. The actuation fluid is pumped into or out of the switching channel 128 through vias or ducts positioned between the contact pads. The central droplet of liquid metal 148 can be separated from droplet 152 by pumping actuation fluid into the switching channel through the duct 158 shown in FIG. 4. Optionally, fluid may simultaneously be pumped out of the switching channel through the via 126 (in FIG. 3). The resulting pressure moves the central liquid metal droplet 148 to the right, as shown in FIG. 4, where it coalesces with the droplet 150. When the pressure in the actuation fluid is equalized, the central droplet 148 remains coalesced with the droplet 150 because of surface tension in the liquid metal. Surface tension also holds the coalesced droplets to the contact pads 134 and 154. The optical path between waveguides 140 and 144 is now opened, whereas the optical path between waveguides 110 and 112 is blocked by the liquid metal. It is noted that in certain embodiments, the slug is coupled to liquid metal droplet 148 so that motion of liquid metal droplet 148 also moves the slug so that the slug assists liquid metal droplet 148 in breaking the path between optical waveguides 140 and 144. It is further noted that when the contact pads are operable to switch one or more electrical signals, the slug and liquid metal droplet 148 may be used to complete an electrical path that carries an electrical signal of the one or more electrical signals. The bottom cap layer 102 is shown in FIG. 5. Referring to FIG. 5, the actuation fluid is stored in reservoirs 116 and 160. The reservoirs may be filled after assembly of the relay through holes 162 and 164. These holes are plugged after the reservoirs are filled. FIG. 6 is a sectional view of the bottom cap layer 102 through the section 6—6 shown in FIG. 5. The reservoir 116 is formed in the layer. The wall of the reservoir 116 may be compliant to reduce the force required to pump liquid into the switching channel.

FIG. 7 is a top view of the pump chamber layer 104 of the relay. Pumping chambers 120 and 165 are formed in the layer and are bounded, in part, by flexible diaphragms. The diaphragms and chambers can be formed by thinning the layer 104 in selected regions. Alternatively, the diaphragms can be made of separate material and attached to the layer. Thicker regions 168 and 170 provide for pressure relief vents 172 and 174. The pressure relief vents allow for slow equalization of the pressure across the diaphragms. The vents resist rapid fluid flow, so that the pumping action of the diaphragm is not impaired.

FIG. 8 is a bottom view of the pump chamber layer 104 of the relay. Piezoelectric elements 122 are attached to the flexible diaphragms 118 and 166. The piezoelectric elements deform in a bending mode when an electric voltage is applied across them. The resulting deformation of the diaphragms moves actuation fluid between the pumping chamber and the switching channel. The electrical control signals are applied to the piezoelectric elements via electrical contacts 124, 176, 178 and 180. Electrical contacts 124 and 176 control the piezoelectric elements on diaphragm 118, while contacts 178 and 180 control the piezoelectric elements on diaphragm 166. The associated electrical circuitry is not shown. Pressure relief vents 172 and 174 pass through the layer.

FIG. 9 is a sectional view through the section 9—9 of the piezoelectric layer 104 shown in FIG. 8. The diaphragm 118 covers the pumping chamber 120. Piezoelectric elements 122 are attached to the diaphragm. Deformation of the diaphragm increases or decreases the volume of the pumping chamber and moves fluid between the pumping chamber of the switching channel. The two piezoelectric pumps may be used together, with one pump contracting the pumping chamber to push actuation liquid into the switching channel while the other pump expands the pumping chamber to draw fluid out from the other end of the channel. This dual action increases the force on the liquid metal.

FIG. 10 is a top view of the via layer 106 of the relay. Vias or ducts 126 and 158 allow passage of actuation fluid from the pumping chambers to pass through the via layer to the switching channel. The lowermost portions of the wettable contact pads 134, 154 and 156 are formed on or attached to the upper surface of the layer and are combined with other portions of the pads in the switching channel and on the top cap layer.

FIG. 11 is a sectional view through the section 11—11 of the via layer 106 shown in FIG. 10. The via 126 passes through the layer. The wettable contact pad 134 is attached to the top surface of the layer 106.

Figure 12:
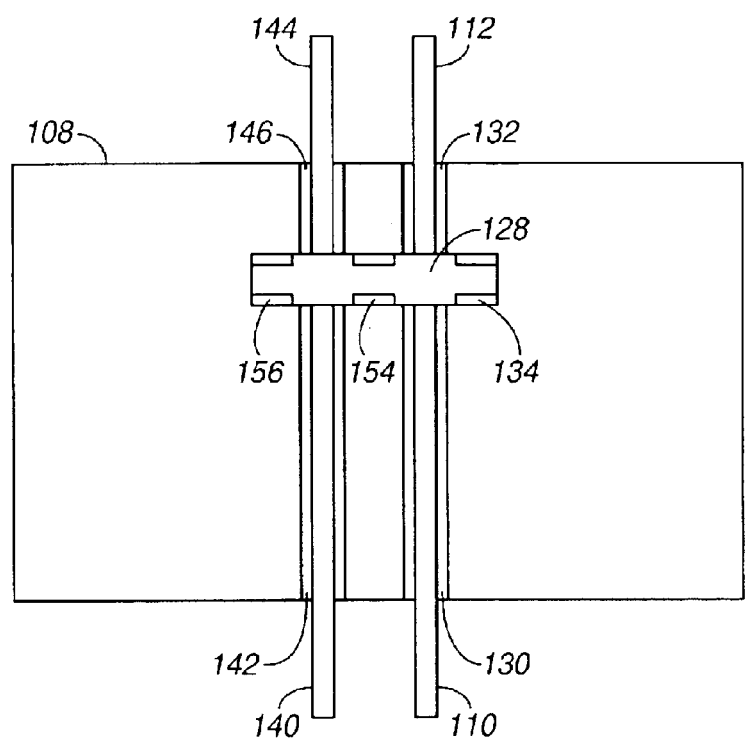
FIG. 12 is top view of a switching layer of an optical relay consistent with certain embodiments of the present invention.

FIG. 12 is a top view of the switching layer 108 of the relay. Optical waveguide 110, embedded in a notch 130 in the switching layer 108, is optically aligned with the optical waveguide 112 (embedded in a notch 132). Optical waveguide 140, embedded in a notch 142 in the switching layer 108, is optically aligned with the optical waveguide 144 (embedded in a notch 146). Portions of the wettable contact pads 134, 154 and 156 are fixed to the inside of the switching channel 128. In certain embodiments of the present invention, the wettable contact pads 134, 154, and 156 are operable to be used to switch the one or more electrical signals.

Figure 13:
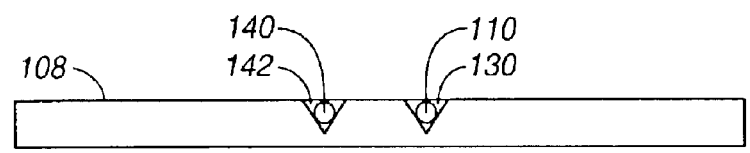
FIG. 13 is side view of a switching layer of an optical relay consistent with certain embodiments of the present invention.

A side view of the switching layer 108 is shown in FIG. 13. The optical waveguides 110 and 140 are imbedded in triangular notches 130 and 142 in the top surface of the layer. The use of notches allows for accurate optical alignment of the waveguides during assembly of the relay.

Figure 14:
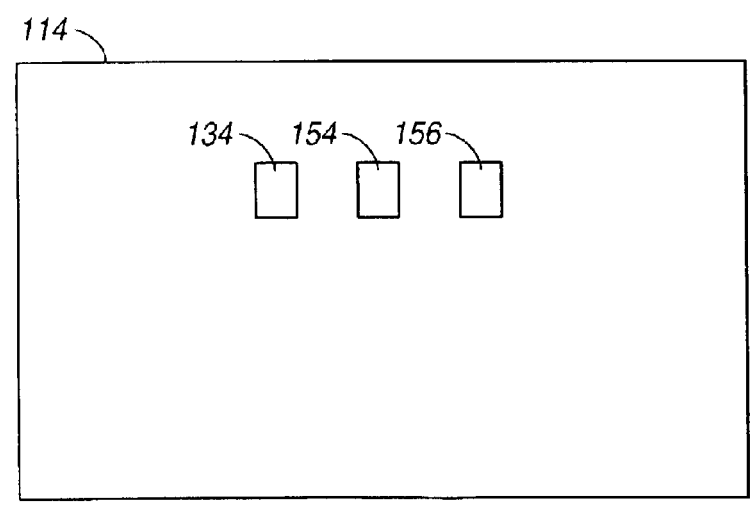
FIG. 14 is bottom view of a top cap layer of an optical relay consistent with certain embodiments of the present invention.

FIG. 14 is a bottom view of the top cap layer 114 of the relay. The topmost portions of the wettable contact pads 134, 154 and 156 are formed or attached to the lower surface of the layer and combined with other potions in the switching channel and the via layer.

The optical relay of the present invention can be made using micro-machining techniques for small size.

One advantage of the use of piezoelectric elements is that they are capacitive devices and store energy rather than dissipating it. As a result, power consumption and heat build up is kept to a minimum.

In a further embodiment, a single piezoelectric pump is used. The pump is operable to pump actuation fluid into the switching channel to push the central liquid metal droplet in one direction and to pump actuation fluid out of the switching channel to pull the central liquid metal droplet in the other direction.

If two piezoelectric pumps are used, they may push alternately, pull alternately, or one may push while the other pulls and vice versa.

While the invention has been described in conjunction with specific embodiments, it is evident that many alternatives, modifications, permutations and variations will become apparent to those of ordinary skill in the art in light of the foregoing description. Accordingly, it is intended that the present invention embrace all such alternatives, modifications and variations as fall within the scope of the appended claims.

What is claimed is:

1. A piezoelectric optical relay comprising:
    a relay housing containing a switching channel;
    first and second contact pads located in the switching channel and each having a surface wettable by a liquid metal;
    a third contact pad located in the switching channel between the first and second contact pads and having a surface wettable by a liquid metal;

a first liquid metal droplet in wetted contact with the first contact pad;

a second liquid metal droplet in wetted contact with the second contact pad;

a third liquid metal droplet in wetted contact with the third contact pad and adapted to move within the switching channel to coalesce with one of the first liquid metal droplet and the second liquid metal droplet;

a first optical path passing through the switching channel between the first and third liquid metal droplets; and a first piezoelectric pump comprising a first pumping chamber bounded in part by a flexible diaphragm and operable to pump actuation fluid between the pumping chamber and the switching channel, thereby causing the third liquid metal droplet to coalesce with one of the first liquid metal droplet and the second liquid metal droplet, wherein the first optical path is broken when the first and third liquid metal droplets are coalesced and is completed when the first and third liquid metal droplets are separated.

2. A piezoelectric optical relay in accordance with claim 1, wherein the first piezoelectric pump is operable to pump actuation fluid into the switching channel through a first via, the first via being positioned between the second liquid metal droplet and the third liquid metal droplet, thereby causing the second and third liquid metal droplets to separate and the first and third liquid metal droplets to coalesce.

3. A piezoelectric optical relay in accordance with claim 1, wherein the first piezoelectric pump is further operable to pump actuation fluid out of the switching channel through a first via, the first via being positioned between the second liquid metal droplet and the third liquid metal droplet, thereby causing the second and third liquid metal droplets to coalesce and the first and third liquid metal droplets to separate.

4. A piezoelectric optical relay in accordance with claim 1, wherein the first piezoelectric pump further comprises at least one piezoelectric element attached to the first flexible diaphragm, the least one piezoelectric element adapted to deform in a bending mode and thereby change the volume the first pumping chamber.

5. A piezoelectric optical relay in accordance with claim 1, wherein the first optical path comprises:

a first optical waveguide configured to transmit light into the switching channel; and a second optical waveguide, optically aligned with the first optical waveguide and configured to receive light from the first optical waveguide when the first and third liquid metal droplets are separated.

6. A piezoelectric optical relay in accordance with claim 1, further comprising a second optical path, passing between the second and third liquid metal droplets.

7. A piezoelectric optical relay in accordance with claim 1, further comprising a slug coupled to the third liquid metal droplet, wherein the slug moves with a motion of the third liquid metal droplet.

8. A piezoelectric optical relay in accordance with claim 7, wherein the relay housing comprises:

a bottom cap layer having a fluid reservoir formed therein;

a switching layer having the switching channel formed therein;

a pump chamber layer containing the first and second piezoelectric pumps and adapted to pump actuation fluid between the fluid reservoir and the switching channel; and a top cap layer, positioned above the switching layer.

9. A piezoelectric optical relay in accordance with claim 1, further comprising a second piezoelectric pump comprising a second pumping chamber bounded in part by a second flexible diaphragm and operable to pump actuation fluid between the second pump chamber and the switching channel through a via, the via being positioned between the first liquid metal droplet and the third liquid metal droplet.

10. A piezoelectric optical relay in accordance with claim 9, further comprising a via layer, positioned between the pump chamber layer and the switching layer, containing first and second fluid ducts coupling the first and second piezoelectric pumps to the switching channel.

11. A piezoelectric optical relay in accordance with claim 9, wherein the first optical path comprises:

a first optical waveguide embedded in a first notch in the switching layer and configured to transmit light into the switching channel; and a second optical waveguide embedded in a second notch in the switching layer and optically aligned with the first optical waveguide, the second optical waveguide being configured to receive light from the first optical waveguide if the first and third liquid metal droplets are separated.

12. A piezoelectric relay comprising:

a relay housing containing a switching channel;

first and second contact pads located in the switching channel and each having a surface wettable by a liquid metal;

a third contact pad located in the switching channel between the first and second contact pads and having a surface wettable by a liquid metal;

a first liquid metal droplet in wetted contact with the first contact pad;

a second liquid metal droplet in wetted contact with the second contact pad;

a third liquid metal droplet in wetted contact with the third contact pad and adapted to move within the switching channel to coalesce with one of the first liquid metal droplet and the second liquid metal droplet;

a first electrical path operable to be coupled to the first contact pad and the third contact pad;

a second electrical path operable to be coupled to the second contact pad and the third contact pad; and a first piezoelectric pump comprising a first pumping chamber bounded in part by a flexible diaphragm and operable to pump actuation fluid between the pumping chamber and the switching channel, thereby causing the third liquid metal droplet to coalesce with one of the first liquid metal droplet and the second liquid metal droplet, wherein the first electrical path is completed when the first and third liquid metal droplets are coalesced and the second electrical path is completed when the second and third liquid metal droplets are coalesced.

13. A piezoelectric relay in accordance with claim 12, further comprising a slug operable to be coupled to one of:

the first contact pad and the third contact pad; and the second contact pad and the third contact pad.

* * * * *